US010795695B2

(12) United States Patent
Shang

(10) Patent No.: US 10,795,695 B2
(45) Date of Patent: Oct. 6, 2020

(54) CONTROL METHOD AND APPARATUS FOR WINDOW IN APPLICATION PROGRAM

(71) Applicant: TENCENT TECHNOLOGY (SHENZHEN) COMPANY LIMITED, Shenzhen, Guangdong (CN)

(72) Inventor: Zi Feng Shang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/764,585

(22) PCT Filed: Mar. 28, 2017

(86) PCT No.: PCT/CN2017/078414
§ 371 (c)(1),
(2) Date: Mar. 29, 2018

(87) PCT Pub. No.: WO2017/167176
PCT Pub. Date: Oct. 5, 2017

(65) Prior Publication Data
US 2018/0285132 A1 Oct. 4, 2018

(30) Foreign Application Priority Data

Apr. 1, 2016 (CN) .......................... 2016 1 0201181

(51) Int. Cl.
G06F 9/451 (2018.01)
G06F 3/0481 (2013.01)
(52) U.S. Cl.
CPC ............ G06F 9/451 (2018.02); G06F 3/0481 (2013.01)
(58) Field of Classification Search
CPC .... G06F 9/451–454; G06F 9/54; G06F 3/048; G06F 9/542; G06F 2209/545
See application file for complete search history.

(56) References Cited

U.S. PATENT DOCUMENTS 6,850,257 B1 * 2/2005 Colleran ............. G06F 11/1415
712/219
2006/0184537 A1 8/2006 Sauve et al.
(Continued)

FOREIGN PATENT DOCUMENTS

CN 102591711 A 7/2012
CN 103197842 A 7/2013
(Continued)

OTHER PUBLICATIONS

International Search Report for PCT/CN2017/078414 dated Jul. 4, 2017 [PCT/ISA/210].
(Continued)

Primary Examiner — Liang Y Li
(74) Attorney, Agent, or Firm — Sughrue Mion, PLLC

(57) ABSTRACT

A method and system that timely processes webpage windows after a window is in an unresponsive stage, a parent window of the webpage window will not be affected and closed, thereby reducing operating resources. The method includes creating a child window corresponding to a parent window, a proxy window corresponding to the child, setting a parent of the child to be the proxy, and setting a parent of the proxy to be the parent window, where a thread to which the proxy window belongs communicates with a thread to which the child window belongs by using an asynchronous message, determining based on the proxy thread, a state of the child window and in response to determining that the child window is unresponsive, setting the proxy window to have no parent and removing the child window from a current display by removing the proxy window.

15 Claims, 5 Drawing Sheets

(56) References Cited

U.S. PATENT DOCUMENTS

| | | | |
|---|---|---|---|
| 2006/0200702 A1 | 9/2006 | Canning et al. | |
| 2006/0230324 A1* | 10/2006 | Cummins | G06F 3/0481 |
| | | | 714/57 |
| 2010/0318832 A1* | 12/2010 | Zeigler | G06F 11/0709 |
| | | | 714/2 |
| 2012/0032945 A1* | 2/2012 | Dare | G06F 3/0481 |
| | | | 345/418 |
| 2015/0007105 A1* | 1/2015 | Li | G09G 5/14 |
| | | | 715/804 |
| 2017/0083166 A1* | 3/2017 | Chen | G06F 3/0481 |

FOREIGN PATENT DOCUMENTS

| | | |
|---|---|---|
| CN | 104035815 A | 9/2014 |
| CN | 104572271 A | 4/2015 |
| CN | 105892817 A | 8/2016 |

OTHER PUBLICATIONS

Written Opinion, dated Jul. 4, 2017 from the International Bureau in counterpart International application No. PCT/CN2017/078414.
Communication dated May 29, 2019 from the State Intellectual Property Office of the P.R.C. in application No. 201610201181.3.
Communication dated Nov. 11, 2019, from The State Intellectual Property Office of the P.R. of China in counterpart Application No. 201610201181.3.
Communication dated Mar. 16, 2020 from the State Intellectual Property Office of the P.R.C. in application No. 201610201181.3.

\* cited by examiner

CONTROL METHOD AND APPARATUS FOR WINDOW IN APPLICATION PROGRAM

CROSS-REFERENCE TO RELATED APPLICATION

This application is a U.S. national stage application under 35 U.S.C. § 371 of International Application No. PCT/CN2017/078414, filed on Mar. 28, 2017, which claims priority from Chinese Patent Application No. 201610201181.3, entitled "CONTROL METHOD AND APPARATUS FOR WINDOWS IN APPLICATION PROGRAM," filed on Apr. 1, 2016, in the Chinese Patent Office, the disclosures of which are incorporated herein by reference in their entirety.

BACKGROUND

1. Field

Methods and apparatuses consistent with example embodiments relate to computer technologies, and specifically to a control method and apparatus for a window in an application program.

2. Description of Related Art

In a Windows operating system, a window is an important component of a user interface. When a user starts running an application program, the application program creates and displays a window. When the user operates an objective in the window, the application program performs a corresponding response. While running the process of the application program, a plurality of windows is created. Associations between different windows include a parent-child relationship, an owning and being owned relationship, and the like. The Windows operating system manages the windows according to the associations between the windows.

SUMMARY

According to example embodiments of this application, there is provided method and apparatus for controlling a window in an application program, which can timely process a child window when it is in an unresponsive stage and avoid its unresponsive stage from being closed, thereby reducing operating resources.

According to example embodiments, there is provided a method and apparatus for controlling a window in an application program, the method including, when creating a child window corresponding to a parent window in the application program, creating a proxy window corresponding to the child window, setting a parent window attribute of the child window to the proxy window, and setting a parent window attribute of the proxy window to the parent window; and communicating, by a thread to which the proxy window belongs, with a thread to which the child window belongs by using an asynchronous message; detecting, by the thread to which the proxy window belongs, a state of the child window; and when it is determined that the child window is an unresponsive state, setting the parent window attribute of the proxy window to no parent window; and removing the child window from a current display interface by removing the proxy window.

According to example embodiments, there is provided an apparatus for controlling windows in an application program, the apparatus including a processor, and a memory storing instructions executable by the processor, the program including a management module, capable of when creating a child window corresponding to a parent window in the application program, creating a proxy window corresponding to the child window, setting a parent window attribute of the child window to the proxy window, and setting a parent window attribute of the proxy window to the parent window, communicating, by a thread to which the proxy window belongs, with a thread to which the child window belongs by using an asynchronous message; a detection module, capable of detecting a state of the child window by using the thread to which the proxy window belongs; and a removing module, capable of when the detection module determines that the child window is an unresponsive state, setting the parent window attribute of the proxy window to no parent window; and removing the child window from a current display interface by removing the proxy window.

According to example embodiments, there is provided a non-transitory computer-readable storage medium storing a program including instructions executable by a processor the program including a management module, capable of when creating a child window corresponding to a parent window in the application program, creating a proxy window corresponding to the child window, setting a parent window attribute of the child window to the proxy window, and setting a parent window attribute of the proxy window to the parent window, communicating, by a thread to which the proxy window belongs, with a thread to which the child window belongs by using an asynchronous message; a detection module, capable of detecting a state of the child window by using the thread to which the proxy window belongs; and a removing module, capable of when the detection module determines that the child window is an unresponsive state, setting the parent window attribute of the proxy window to no parent window; and removing the child window from a current display interface by removing the proxy window.

BRIEF DESCRIPTION OF THE DRAWINGS

The accompanying drawings described herein are used for providing further understanding for this application and constitute a part of this application. Example embodiments of this application and descriptions thereof are used for explaining this application and do not constitute an improper limitation to this application.

DETAILED DESCRIPTION OF THE EXAMPLE EMBODIMENTS

Figure 1:
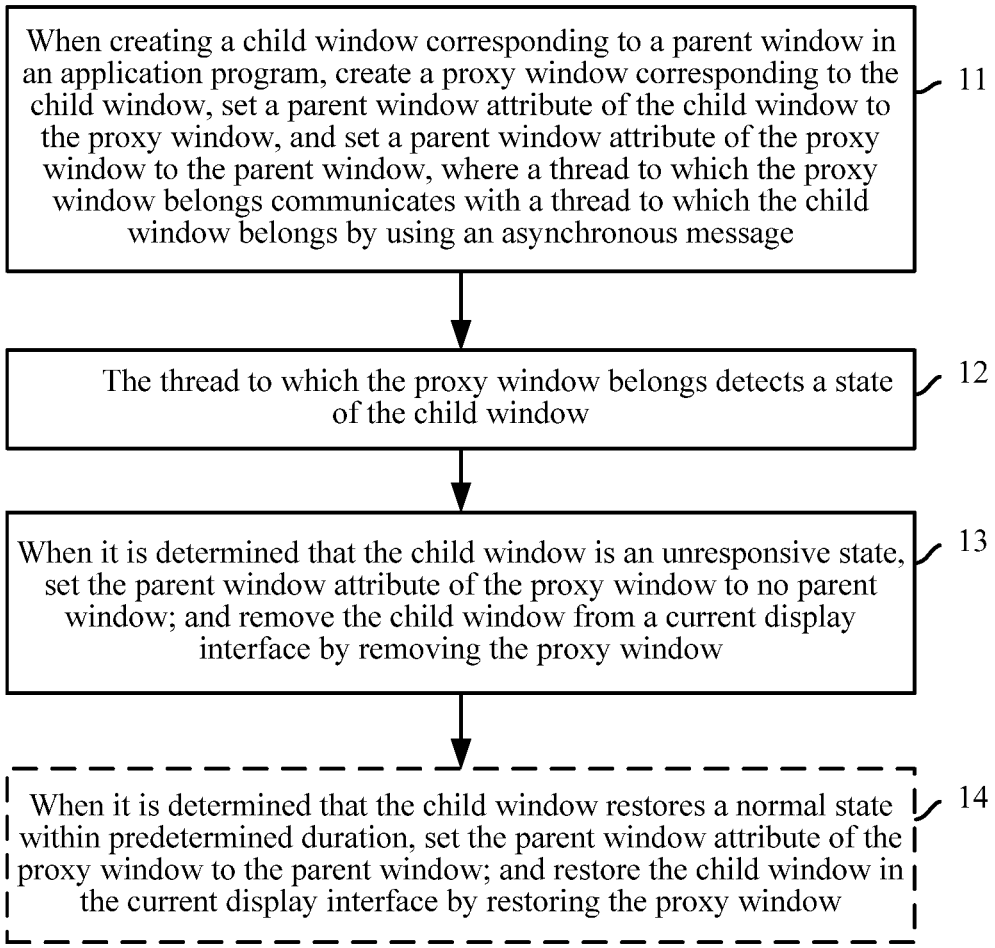
FIG. 1 is a flowchart of a control method for a window in an application program according to example embodiments of this application.

To make a person skilled in the art better understand solutions of this application, the following clearly and completely describes the technical solutions in example embodiments of this application with reference to the accompanying drawings in the example embodiments of this application. It should note that the embodiments to be described are some rather than all of the example embodiments of this application. All other embodiments obtained by a person skilled in the art based on the example embodiments of the present application without creative efforts shall fall within the protection scope of the present application.

The ClientBase Windows software is a software designed based on a window structure. A window is a most important part in a user interface. The window is a rectangular area corresponding to an application program on a display screen that includes a frame and a client area, and it is a visible interface between a user and the application program. Each time a user starts running an application program, the application program then creates and displays a window. When the user operates an object in the window, the application program performs a corresponding response. A user ends running of a program by closing a window, and selects a corresponding application program by selecting an application program window.

A relationship between windows may be a parent-child relationship, which usually indicates an owning-and-being owned relationship. For example, a lower-level window included by or derived from a window can generally be referred to a child window of this window. Moreover, correspondingly, this window may be referred to as a parent window of the child window. It may be noted that the parent window and the child window are relative concepts. For example, when there are windows of multiple levels, a parent window may also be a child window of another window, and a child window may also be a parent window of another parent window. In an exemplary embodiment of this application, "parent window" is used for representing a window, and "child window" is used for representing a lower-level window of the parent window. The two terms are merely used for representing a relationship between two windows instead of limiting the windows. For example, the two terms are not used for limiting content, forms, and the like of the windows. Based on the relationship, the Windows operating system managing the window's display, focuses, sizes, and the like accordingly. A parent-child relationship between a parent window and a child window may be that: when the parent window moves, the child window also needs to move, when the parent window is hidden, the child window also needs to be hidden, and so on. In some example embodiments, the child window may be a control, such as a button, a list box, or a combo box, displayed on a dialog box. For a browser, the parent window may be a browser framework parent window, and the child window may be a browser tab.

During the course of research, the applicant of this application discovered that a child window in its unresponsive state causes a parent window to be unresponsive. In an existing window management method, in order to prevent a parent window from being unresponsive, a child window is created by using an independent process such that when the child window is created independently in its unresponsive state it will be closed directly, without affecting the parent window.

However, a relatively large quantity of child windows must be created while running the process of the application program if each child window is created using an independent process, and therefore using a large quantity of system process resources. In addition, because a relatively large quantity of processes needed to be maintained, the implementation is complex. Moreover, if the child window is only temporarily in an unresponsive state and can be restored to a normal state, because a process to which the child window belongs has been closed, the child window cannot be restored, and the child window must be re-created, resulting in waste system resources.

In view of above, the example embodiments of this application provide a control method for a window in an application program. This control method includes: when creating a child window corresponding to a parent window in an application program, a proxy window corresponding to the child window is created, the parent window of the child window is set to be the proxy window, and the parent window of the proxy window to is set as the parent window, wherein a thread in which the proxy window belongs communicates with a thread to which the child window belongs by using an asynchronous message; by the thread to which the proxy window belongs detects a state of the child window; when it is determined that the child window is in an unresponsive state, the proxy window is set to have no parent window; and the child window is removed from a current display interface by way of removing the proxy window.

FIG. 1 is a flowchart of a control method for a window in an application program according to example embodiments of this application. As shown in FIG. 1, the method includes the following steps.

In Step 11, when creating a child window corresponding to a parent window in an application program, creating a proxy window corresponding to the child window, setting a parent window attribute of the child window to the proxy window, and setting a parent window attribute of the proxy window to the parent window, where a thread to which the proxy window belongs communicates with a thread to which the child window belongs by using an asynchronous message.

In example embodiments of this application, after a parent window in an application program is created, when a child window corresponding to the parent window needs to be created, not only a child window is created, but also a proxy window corresponding to the child window is created. A parent window attribute of the child window is set to the proxy window, and a parent window attribute of the proxy window is set to the parent window.

In t example embodiments of this application, the proxy window and the child window belong to different threads, and the thread to which the proxy window belongs communicates with the thread to which the child window belongs by using an asynchronous message. In addition, according to different requirements, the thread to which the proxy window belongs and a thread to which the parent window belongs may be the same or different. When the child window is in a normal state, the thread to which the parent window belongs also communicates with the thread to which the child window belongs by using an asynchronous message.

In addition, in display control on windows, a child window is usually superimposed on a parent window. In an exemplary embodiment of this application, an order of superimposition of the parent window, the proxy window, and the child window is that the parent window is located on a lowest layer, the proxy window is located on a middle layer, and the child window is located on a topmost layer.

In Step 12, the thread to which the proxy window belongs detects a state of the child window.

In Step 12, the thread to which the proxy window belongs determines whether a message sent from the child window is received within predetermined duration. If the message sent from the child window is received within the predetermined duration, it is determined that the child window is in a normal state, and if the message sent from the child window is not received within the predetermined duration, it is determined that the child window is in an unresponsive state. In an exemplary embodiment of this application, the message sent from the child window may be a heartbeat message.

In an exemplary embodiment of this application, when the thread to which the proxy window belongs does not receive a heartbeat message sent from the child window within the predetermined duration, the thread to which the proxy window belongs may send a synchronous message to the child window, and if feedback to the synchronous message is not received, it is determined that the child window is in an unresponsive state.

In an exemplary embodiment of this application, the thread to which the proxy window belongs is used for detecting a state of the child window, and another control operation on the child window may be performed by the tread to which the parent window of the child window belongs. For example, when a size of the parent window is changed, the thread to which the parent window belongs adjusts a size of the child window by sending an asynchronous message.

In Step 13, when it is determined that the child window is an unresponsive state, set the parent window attribute of the proxy window to no parent window; and child window is removed from a current display interface by way of removing the proxy window.

In Step 13, when it is determined that the child window is in an unresponsive state, the parent window attribute of the proxy window is set as a non-parent window. That is, the proxy window and the parent window no longer have a parent-child relationship so that the parent window is not affected by the child window when the child window is in its unresponsive state. In addition, the child window is removed from the current display interface so that a user cannot perform an operation on the child window, thereby avoiding worsening the child window's unresponsive state.

Further, in Step 13, because a relationship between the proxy window and the child window is a parent-child relationship, by means of an operation of removing the proxy window, both of the proxy window and the child window can be removed from the current display interface. In example embodiments of this application, a proxy window may be removed by hiding the proxy window or moving the proxy window out of the current display interface.

In example embodiments of this application, when it is determined that the child window is in an unresponsive state, in addition to the operation described above in step 13, the thread to which the proxy window belongs may further create a ghost window at a position where the child window belongs and display an image of the child window being in the unresponsive state in the ghost window to avoid displaying the blank content in the child window's original position; after the proxy window and the child window are removed. This process provides the user with better window content experiences because there is no superimposition of content of the child window. If the number of times the user operates the ghost window exceeds a predetermined threshold, prompt information indicating that the child window is unresponsive may be displayed to the user, to prevent the user from continuing to perform an operation on the ghost window.

According example embodiments, the proxy window can find that the child window is in the unresponsive state in time, the proxy window is set to have no parent window, and by way of removing the proxy window, the child window is thereby removing from the current display interface. Because there is no parent-child relationship between the parent window and the proxy window, the unresponsive state of the child window would not affect normal running of the parent window, thereby preventing the parent window from entering an unresponsive state. In addition, since there is no need to directly close a process to which a child window in an unresponsive state, thereby avoiding the waste of system process resources. In example embodiments of this application, the method may further include the following steps.

In Step 14, when it is determined that the child window restores a normal state within predetermined duration, set the parent window attribute of the proxy window to the parent window; and restore the child window in the current display interface by restoring the proxy window.

In Step 14, because a relationship between the proxy window and the child window is a parent-child relationship, by means of an operation of restoring the proxy window, both of the proxy window and the child window can be restored in the current display interface. In example embodiments of this application, according to different manners of removing the proxy window, a manner of restoring the proxy window may be displaying the proxy window or moving the proxy window into the current display interface.

In example embodiments of this application, if a ghost window is created when the child window is in the unresponsive state, in this step, when it is determined that the child window restores a normal state within predetermined duration, the ghost window is deleted.

In example embodiments of this application, if the proxy window and the child window belong to different processes, when the child window does not restore the normal state within the predetermined duration, the process to which the child window belongs is deleted.

According to example embodiments, if the child window is only temporarily in an unresponsive state and would restore a normal state after a period of time, by means of applying the example embodiments of this application, the child window can be restored in the current display interface when the child window restores the normal state, so that a child window in an unresponsive state can be effectively prevented from being mistakenly deleted, no duplication of creating a same child window thereby saving system resources.

Figure 2:
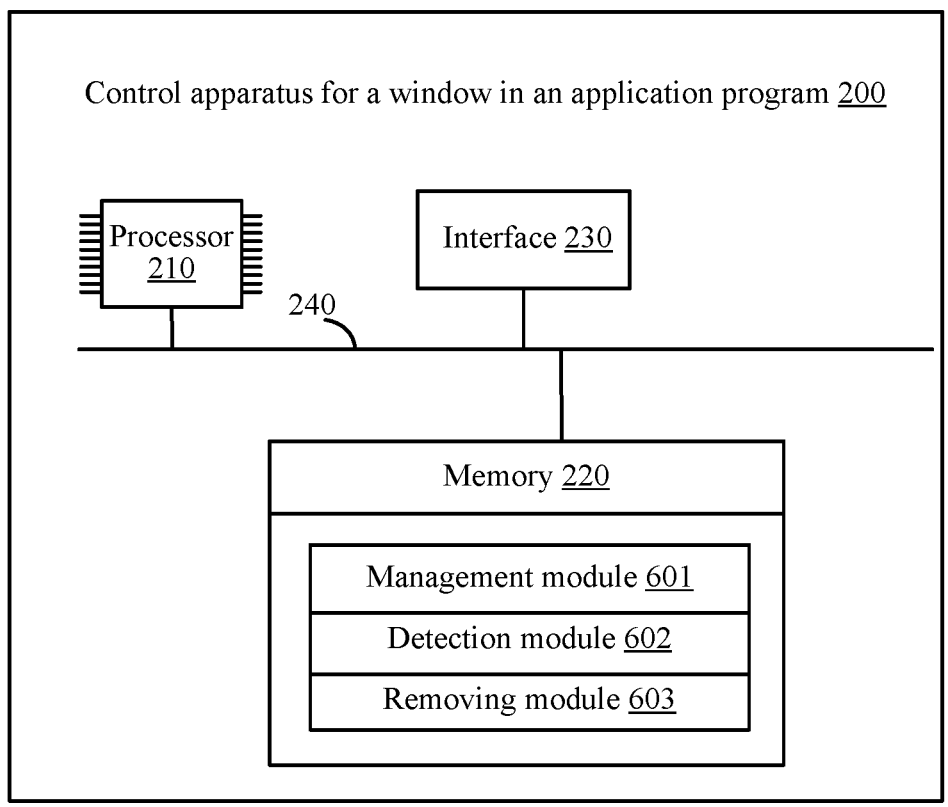
FIG. 2 is a schematic diagram of a structure of a control apparatus for a window in an application program according to example embodiments of this application.

FIG. 2 is a schematic structural diagram of a control apparatus for a window in an application program in example embodiment of this application. As shown in FIG. 2, the control apparatus 200 for a window in an application program includes a processor 210, a non-transitory computer-readable memory 220, and an interface 230. These components perform communication through a bus 240. The processor 210 may obtain an operation of a user on a window by using the interface 230 and implement a solution provided by example embodiments of this application by reading a program module in the memory 220.

In example embodiments of this application, program modules stored in the memory 220 include a management module 601, a detection module 602, and a removing module 603. The functions and working principles of modules 601 to 603 would be described below in detail.

The processor 210 may execute the program modules stored in the memory 220 to: when creating a child window corresponding to a parent window in an application program, create a proxy window corresponding to the child window, set a parent window of the child window to be the proxy window, and set a parent window of the proxy window to be the parent window, where a thread to which the proxy window belongs communicates with a thread to which the child window belongs by using an asynchronous message; detect, by the thread to which the proxy window belongs, a state of the child window; when it is determined that the child window is in an unresponsive state, set the proxy window to have no parent window; and remove the child window from a current display interface by removing the proxy window.

A browser is used as an example below to describe the control method for a window in an application program provided by the example embodiments of this application.

Figure 3:
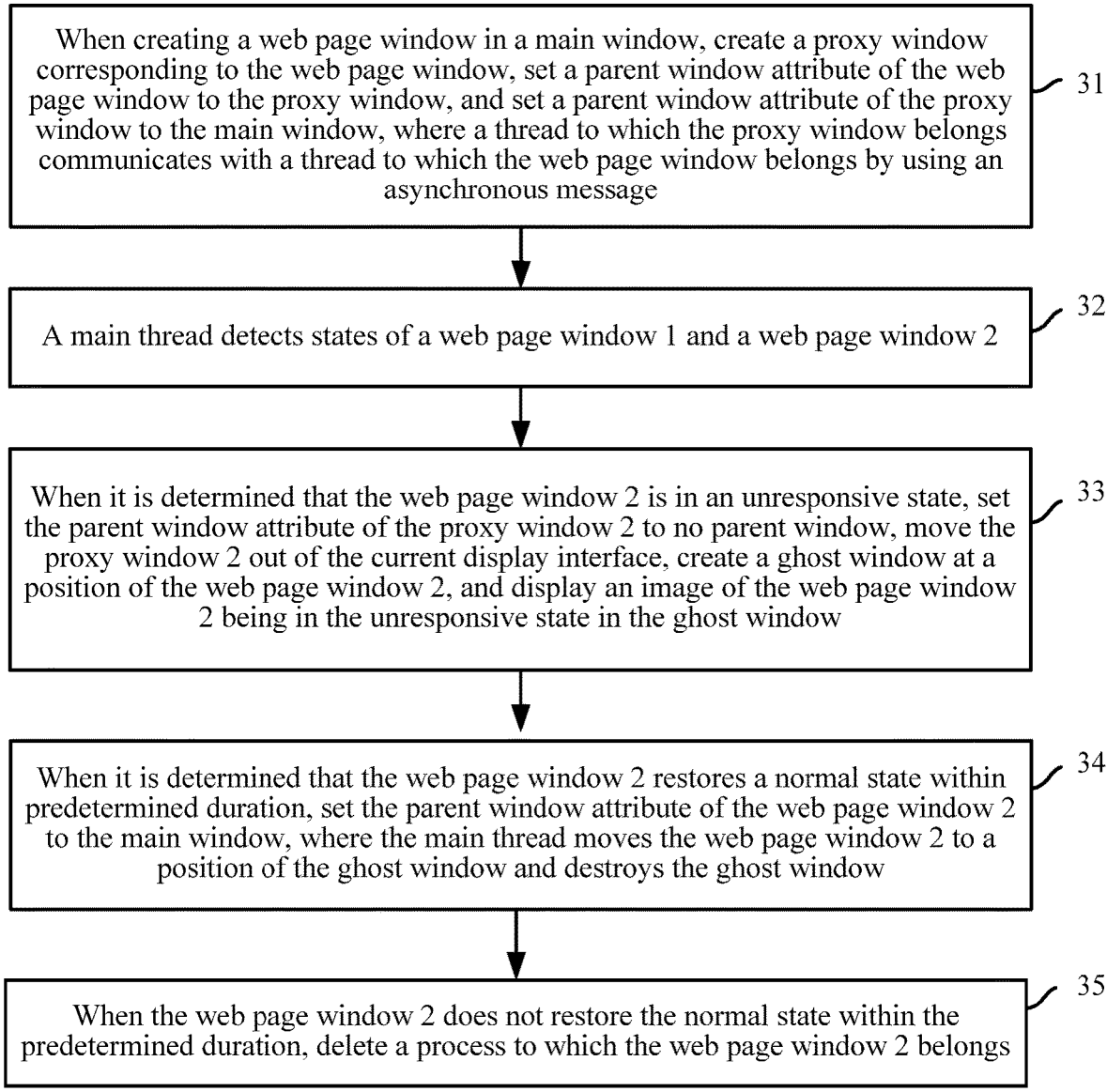
FIG. 3 is a flowchart of applying a control method for a window in an application program to browser window control according to example embodiments of this application.

FIG. 3 is a flowchart of a control method for a window in an application program according to example embodiments of this application. In example embodiments, the application program is a browser, the parent window is a main window of the browser and is also referred to as a main frame window, and the child window is at least one web page window in the main window.

In Step 31, when creating a web page window in a main window, create a proxy window corresponding to the web page window, set a parent window attribute of the web page window to the proxy window, and set a parent window attribute of the proxy window to the main window, where a thread to which the proxy window belongs communicates with a thread to which the web page window belongs by using an asynchronous message.

Figure 4:
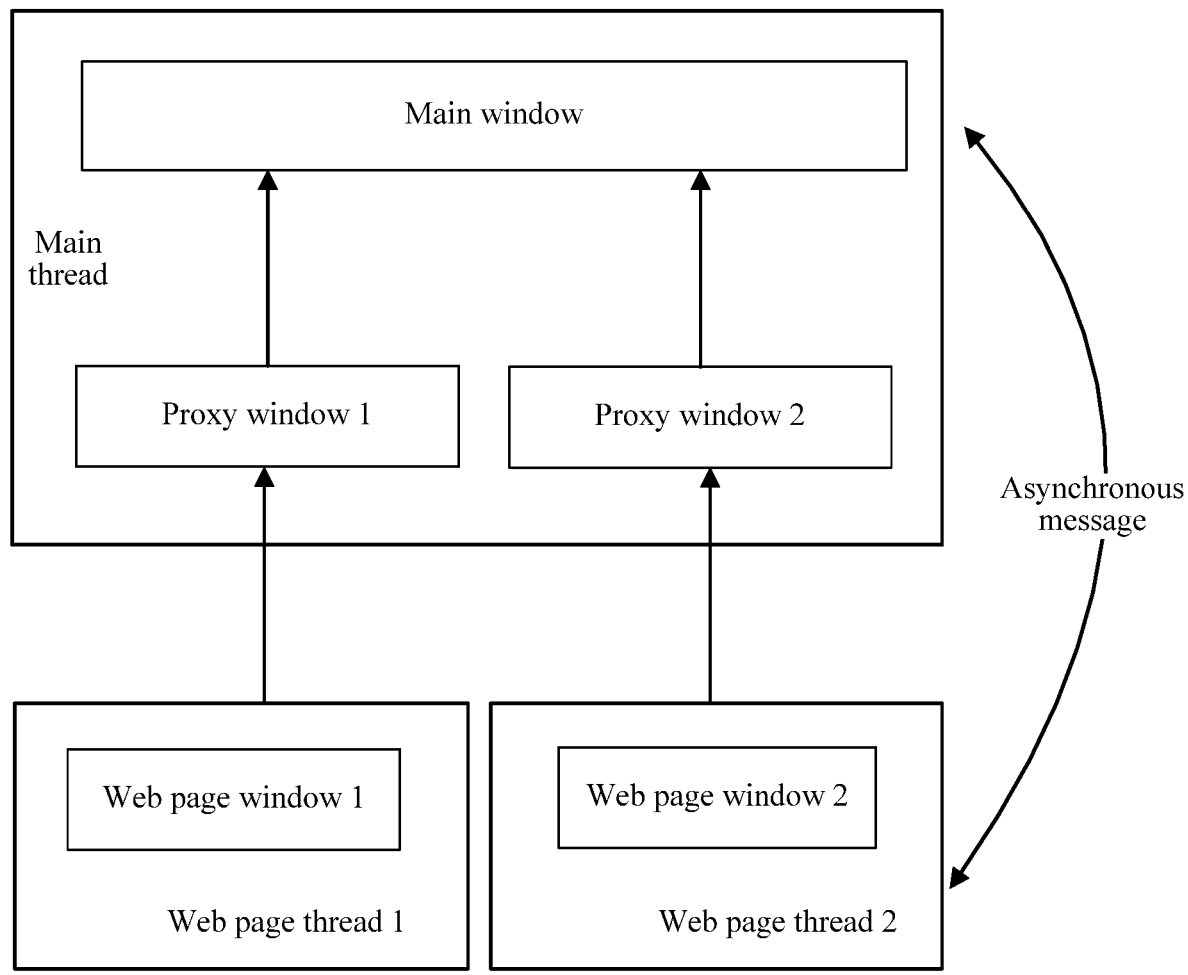
FIG. 4 is a structural diagram of a window when a web page window is in a normal state in example embodiments of this application.

In example embodiments of this application, as shown in FIG. 4, a web page window 1 is created by using a web page thread 1, and a web page window 2 is created by using a web page thread 2. A main window and a proxy window 1 and a proxy window 2 that respectively correspond to the web page window 1 and the web page window 2 are created by using a main thread. A parent-child relationship between the main window and the proxy window and a parent-child relationship between the proxy window and the web page window are indicated by using arrows. Communication is performed between the main thread and the web page thread by using an asynchronous message. For example, when setting a state of the web page window 1, the main thread does not directly invoke a Win32 API, and instead, sends an asynchronous message to the web page thread, and the web page thread sets the state of the web page window 1 according to the received message. For another example, when a size of the main window changes, the main thread sends an asynchronous message to the web page thread, and the web page thread adjusts sizes of the web page window 1 and the web page window 2 according to the received asynchronous message.

In example embodiments of this application, a size of the main window located on the lowest layer is the same as that of a display interface of the browser, and in addition to a position reserved for the web page window, an address bar, a tool bar, and the like are further included. A size of the proxy window located on the middle layer is the same as that of the web page window located on the topmost layer.

In Step 32 the main thread detects states of a web page window 1 and a web page window 2.

In Step 32, the main thread determines whether heartbeat messages sent from the web page window 1 and the web page window 2 are received within predetermined duration. In an example embodiment of this application, the predetermined duration may be set according to actual requirements. For example, the predetermined duration may be set to 3 seconds. In this step, if the main thread does not receive a heartbeat message sent from the web page window 2 within 3 seconds, it is determined that the web page window 2 is in an unresponsive state, and step 33 is performed.

In Step 33, when it is determined that the web page window 2 is in an unresponsive state, set the parent window attribute of the proxy window 2 to no parent window, move the proxy window 2 out of the current display interface, create a ghost window at a position of the web page window 2, and display an image of the web page window 2 being in the unresponsive state in the ghost window.

Figure 5:
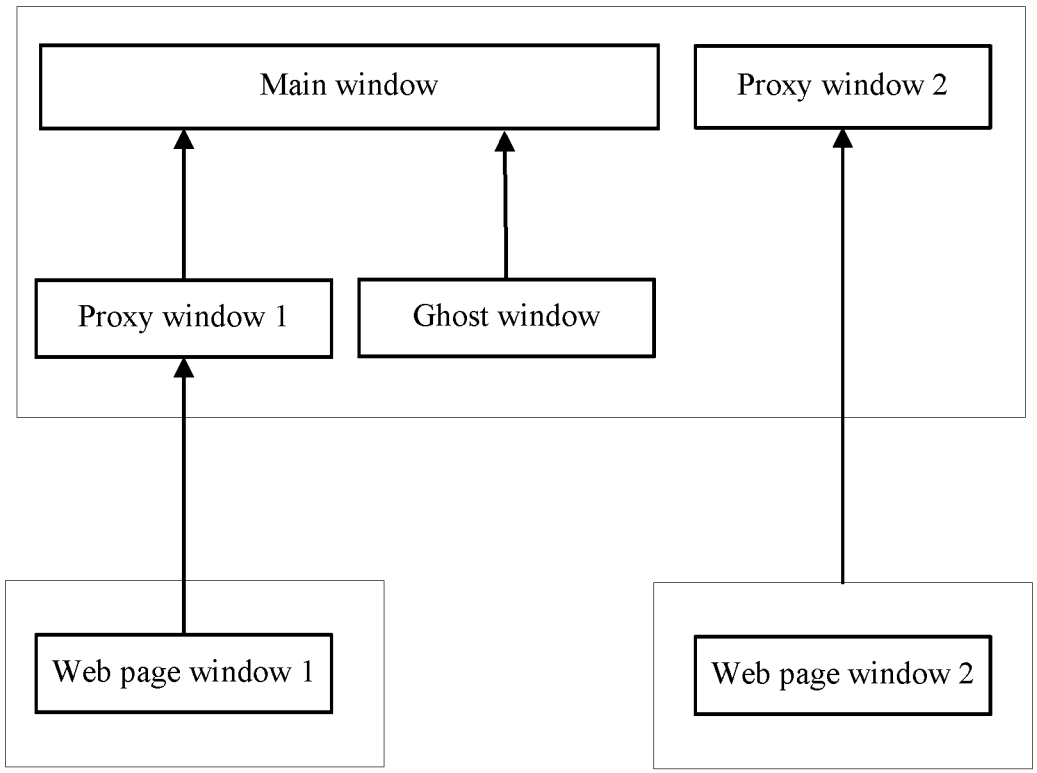
FIG. 5 is a structural diagram of a window when a web page window is in an unresponsive state in example embodiments of this application.

In an example embodiment of this application, as shown in FIG. 5, the parent window attribute of the proxy window 2 is changed from the main window to NULL, and meanwhile, according to a window rule of the Windows operating system, a window attribute of the proxy window is changed from WS_CHILD to WS_POPUP, so as to separate the main window from an association with the proxy window 2, thereby preventing the main window from being affected by the proxy window and the web page window.

In Step 33, the main thread moves the proxy window 2 out of the current display interface. For example, a distance by which the proxy window 2 moves is set to a larger value, so as to move the proxy window 2 out of a display screen. Because the proxy window 2 is the parent window of the web page window 2, the web page window 2, together with the proxy window 2, is move out of the display screen. Meanwhile, the main thread creates a ghost window at the position of the web page window 2. A parent window attribute of the ghost window is the main window. The main thread captures an image, such as a bitmap, of the web page window 2 being in an unresponsive state, and the bitmap is drawn into the ghost window. Upon the foregoing processing, after the web page window 2 is unresponsive, for a user, content displayed on a display interface is unchanged, and browsing content of the web page window by the user is not affected. However, because only picture display is performed in the ghost window, and no response would be made to an operation of the user, the operation of the user would not affect the web page window, thereby preventing the operation of the user from processing the unresponsive state of the web page window 2.

In addition, in this example embodiment of this application, to prevent a user from frequently performing invalid operations on the ghost window, when a quantity of operations received from the user on the ghost window exceeds a predetermined threshold, prompt information indicating that the web page window 2 is unresponsive may be displayed to the user. For example, when a quantity of operations of the user on the ghost window exceeds three, prompt information, "The current window is unresponsive, and please wait", is displayed to the user.

In Step 34, when it is determined that the web page window 2 restores a normal state within predetermined duration, set the parent window attribute of the web page window 2 to the main window, where the main thread moves the web page window 2 to a position of the ghost window and destroys the ghost window.

In an example embodiment of this application, the predetermined duration may be set according to requirements, for example, be set to 10 seconds. After determining that the web page window 2 is in the unresponsive state, if receiving a heartbeat message of the web page window 2 again within 10 seconds, the main thread determines that web page window 2 restores a normal state within the predetermined duration. The main thread changes the parent window attribute of the proxy window 2 from NULL to the main window and changes an attribute of the proxy window 2 from WS_POPUP to WS_CHILD.

In Step 34, the main thread moves the proxy window 2 to the position of the ghost window and destroys the ghost window at the same time. Correspondingly, the web page window 2 is also moved to the original position as the child window of the proxy window 2, and is displayed normally.

In Step 35: when the web page window 2 does not restore the normal state within the predetermined duration, delete a process to which the web page window 2 belongs.

In an example embodiment of this application, if the web page window 2 does not restore the normal state within the predetermined duration, the thread to which the web page window 2 belongs does not need to be processed. If the web page window 2 and the proxy window 2 belong to different processes, the process to which the web page window 2 belongs can be directly deleted, to release system resources.

In an example embodiment, the web page window 2 and the proxy window 2 belong to different processes, and if the web page window 2 does not restore the normal state within 10 seconds, the process to which the web page window 2 belongs is deleted.

It could be noted from the foregoing example embodiments that after the web page window is in the unresponsive state, the state of the parent window would not be affected. In addition, because it is not needed to directly close a process to which a child window in an unresponsive state belongs, waste of system process resources is avoided. Further, if the child window is only temporarily in an unresponsive state, by means of applying the an example embodiment of this application, the child window can be restored in the current display interface when the child window restores the normal state, so that a child window in an unresponsive state can be effectively prevented from being mistakenly deleted, it is not needed to create a same child window repeatedly, and system resources are saved.

Figure 6:
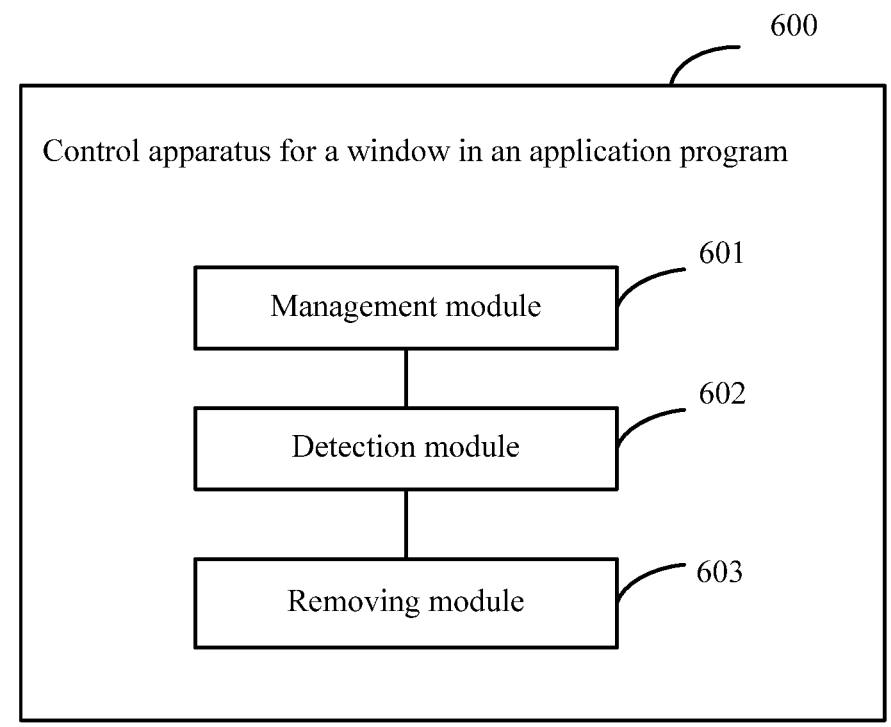
FIG. 6 is a schematic diagram of a structure of a control apparatus for a window in an application program according to example embodiments of this application.

FIG. 6 is a schematic diagram of a structure of a control apparatus for a window in an application program according to an example embodiment of this application. As shown in FIG. 6, the control apparatus 600 for a window in an application program includes a management module 601, a detection module 602, and a removing module 603.

The management module 601 creates a proxy window corresponding to the child window, set a parent window attribute of the child window to the proxy window, and set a parent window attribute of the proxy window to the parent window, where a thread to which the proxy window belongs communicates with a thread to which the child window belongs by using an asynchronous message when creating a child window corresponding to a parent window in the application program.

The detection module 602 detects a state of the child window by using the thread to which the proxy window belongs.

The removing module 603 sets the parent window attribute of the proxy window to no parent window; and remove the child window from a current display interface by removing the proxy window when the detection module determines that the child window is an unresponsive state.

In example embodiments of this application, the management module 601 sets the parent window attribute of the proxy window to the parent window; and restore the child window in the current display interface by restoring the proxy window when the detection module 602 determines that the child window restores a normal state within predetermined duration.

In example embodiments of this application, the management module 601 creates a ghost window at a position of the child window, and display an image of the child window being in the unresponsive state in the ghost window when the detection module 602 determine that the child window is in the unresponsive state, and the management module 601 destroys the ghost window when it is determined that the child window restores a normal state within predetermined duration.

In example embodiments of this application, the management module 601 displays prompt information indicating that the child window is unresponsive to the user when a quantity of operations received from a user on the ghost window exceeds a predetermined threshold.

In example embodiments of this application, the detection 602 detects a state of the child window by determining, by using the thread to which the proxy window belongs, whether a heartbeat message sent from the child window is received within predetermined duration.

In example embodiments of this application, if the proxy window and the child window belong to different processes, the management module 601 deletes the process to which the child window belongs when the child window does not restore the normal state within the predetermined duration.

According to the control apparatus for a window in an application program provided by the example embodiments of this application, after the web page window is in the unresponsive state, the state of the parent window would not be affected. In addition, because it is not needed to directly kill a process to which a child window in an unresponsive state belongs, waste of system process resources is avoided. Further, if the child window is only temporarily in an unresponsive state, by means of applying the example embodiments of this application, the child window can be restored in the current display interface when the child window restores the normal state, so that a child window in an unresponsive state can be effectively prevented from being mistakenly killed, it is not needed to create a same child window repeatedly, and system resources are saved.

The control method provided in the foregoing example embodiments belongs to the same concept as the example embodiments of the control apparatus. For a specific implementation process of the control apparatus, refer to the method embodiment, and details are not described herein again.

In addition, functional modules in the example embodiments of this application may be integrated into one processing unit, or each of the modules may exist alone physically, or two or more modules may be integrated into one unit. The integrated unit may be implemented in a form of hardware, or may be implemented in a form of a software functional unit.

In addition, each example embodiment of this application may be implemented by a data processing program executed by a data processing device such as a computer. The data processing program constitutes this application. A data processing program stored in a storage medium is directly read from the storage medium for execution or the program is installed on or replicated to a storage device (such as a hard disk or memory) of a data processing device for execution. Therefore, such a storage medium also constitutes this application. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, this application further provides a storage medium, which stores a data processing program. The data processing program is used for executing any example embodiment of the foregoing method of this application.

A person of ordinary skill in the art may understand that all or some of the steps of the foregoing example embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred example embodiments of this application, but are not intended to limit the present disclosure. Any modification, refinement, or improvement made within the spirit and principle of the present disclosure shall fall within the protection scope of this application.

In addition, aspects of one disclosed example embodiment may be used with aspects of other disclosed example embodiments without departing from the spirit of this disclosure.

What is claimed is:

1. A control method for a window in an application program, the method comprising:
    creating a child window corresponding to a parent window in the application program;
    creating a proxy window corresponding to the child window;
    setting a parent window attribute of the child window to the proxy window;
    setting a parent window attribute of the proxy window to the parent window, wherein a thread to which the proxy window belongs communicates with a thread to which the child window belongs by using an asynchronous message, the child window being a lower-level window of the parent window; and
    determining, by the thread to which the proxy window belongs, a state of the child window, and in response to determining that the child window is in anunresponsive state, setting the parent window attribute of the proxy window to no parent window, and removing the child window from a current display interface by removing the proxy window;
    wherein the proxy window and the child window are in different processes, and the method further comprises:
        determining, by the thread to which the proxy window belongs, that the child window is in the unresponsive state when a first message sent from the child window is not received within a first predetermined duration; and
        in response to determining that the child window is in the unresponsive state:
            moving the child window by a distance so as to be outside of a display screen;
            creating a ghost window at a position of the child window and displaying an image of the child window being in the unresponsive state in the ghost window;
        determining whether the child window restores a normal state by determining whether a second message sent from the child window is received within a second predetermined duration;
        in response to determining that no message has been received within the second predetermined duration, deleting a first process to which the child window belongs; and
        in response to determining that the second message has been received within the second predetermined duration, removing the ghost window and restoring the child window.

2. The method according to claim 1, further comprising:
    in response to determining that the child window restores the normal state within the second predetermined duration, setting the parent window attribute of the proxy window to the parent window; and
    restoring the child window in the current display interface by restoring the proxy window.

3. The method according to claim 1, wherein the displaying the image of the child window being in the unresponsive state in the ghost window comprises:
    capturing the image of the child window being in the unresponsive state; and pasting the captured image into the ghost window.

4. The method according to claim 1, further comprising:
    when a quantity of operations performed on the ghost window exceeds a predetermined threshold, displaying prompt information indicating that the child window is unresponsive.

5. The method according to claim 1, wherein the first or the second message sent from the child window is a heartbeat message.

6. The method according to claim 1, wherein the second predetermined duration is longer than the first predetermined duration.

7. A control apparatus for a window in an application program, the control apparatus comprising:
    at least one memory configured to store computer program code; and
    at least one processor configured to access said at least one memory and operate according to said computer program code, said computer program code including:
    management code configured to cause at least one of said at least one processor to:
        create a child window corresponding to a parent window in the application program;
        create a proxy window corresponding to the child window, and set a parent window attribute of the child window to the proxy window; and
        set a parent window attribute of the proxy window to the parent window, wherein a thread to which the proxy window belongs communicates with a thread to which the child window belongs by using an asynchronous message, the child window being a lower-level window of the parent window;
    determining code configured to cause at least one of said at least one processor to determine a state of the child window by using the thread to which the proxy window belongs; and
    removing code configured to cause at least one of said at least one processor to set the parent window attribute of the proxy window to no parent window, and remove the child window from a current display interface by removing the proxy window in response to determining that the child window is in an unresponsive state, wherein the proxy window and the child window are in different processes, and said computer program code further comprises:
code configured to cause at least one of said at least one processor to determine, by using the thread to which the proxy window belongs, that the child window is in the unresponsive state when a first message sent from the child window is not received within a first predetermined duration; and
code configured to cause at least one of said at least one processor to, in response to determining that the child window is in the unresponsive state;
move the child window by a distance so as to be outside of a display screen;
create a ghost window at a position of the child window and display an image of the child window being in the unresponsive state in the ghost window;
determine whether the child window restores a normal state by determining whether a second message sent from the child window is received within a second predetermined duration;
in response to determining that no message has been received within the second predetermined duration, delete a first process to which the child window belongs; and
in response to determining that the second message has been received within the second predetermined duration, remove the ghost window and restore the child window.

8. The control apparatus according to claim 7, wherein:
the management code is further configured to cause at least one of said at least one processor to set the parent window attribute of the proxy window to the parent window, and restore the child window in the current display interface by restoring the proxy window in response to determining that the child window restores to the normal state within the second predetermined duration.

9. The control apparatus according to claim 7, wherein:
the management code is further configured to cause at least one of said at least one processor to display prompt information indicating that the child window is unresponsive to a user operation in response to determining a quantity of operations performed on the ghost window exceeding a predetermined threshold.

10. The control apparatus according to claim 7, wherein:
the first or second message sent from the child window is a heartbeat message.

11. A control apparatus for a window in an application program, the control apparatus comprising at least one memory and at least one processor, the at least one memory storing computer-readable instructions executable by at least one of said at least one processor to cause at least one of said at least one processor to:
create a child window corresponding to a parent window in the application program;
create a proxy window corresponding to the child window;
set a parent window attribute of the child window to the proxy window;
set a parent window attribute of the proxy window to the parent window, wherein a thread to which the proxy window belongs communicates with a thread to which the child window belongs by using an asynchronous message; and
determine a state of the child window by using the thread to which the proxy window belongs, and in response to determining that the child window is in an unresponsive state, set the parent window attribute of the proxy window to no parent window, and remove the child window from a current display interface by removing the proxy window,
wherein the instructions are executable by at least one of said at least one processor to further cause at least one of said at least one processor to:
determine, by using the thread to which the proxy window belongs, that the child window is in the unresponsive state when a first message sent from the child window is not received within a first predetermined duration; and
in response to determining that the child window is in the unresponsive state:
move the child window by a distance so as to be outside of a display screen;
create a ghost window at a position of the child window and display an image of the child window being in the unresponsive state in the ghost window;
determine whether the child window restores a normal state by determining whether a second message sent from the child window is received within a second predetermined duration;
in response to determining that no message has been received within the second predetermined duration, delete a first process to which the child window belongs; and
in response to determining that the second message has been received within the second predetermined duration, remove the ghost window and restore the child window.

12. The control apparatus according to claim 11,
wherein the instructions are executable by at least one of said at least one processor to further cause at least one of said at least one processor to determine when the child window restores to the normal state within the second predetermined duration, and in response to the normal state determination, cause at least one of said at least one processor to set the parent window attribute of the proxy window to the parent window and restore the current display interface in the child window by restoring the proxy window.

13. The control apparatus according to claim 11,
wherein the instructions are executable by at least one of said at least one processor to further cause at least one of said at least one processor to, in response to a quantity of operations performed on the ghost window exceeding a predetermined threshold, display prompt information indicating that the child window is unresponsive to a user operation.

14. The control apparatus according to claim 11,
wherein the first or second message sent from the child window is a heartbeat message.

15. A non-transitory computer-readable storage medium storing a program comprising instructions executable by at least one of at least one processor to cause at least one of said at least one processor to:
create a child window corresponding to a parent window in an application program;
create a proxy window corresponding to the child window;
set a parent window attribute of the child window to the proxy window;
set a parent window attribute of the proxy window to the parent window, wherein a thread to which the proxy window belongs communicates with a thread to which the child window belongs by using an asynchronous message; and determine, by the thread to which the proxy window belongs, a state of the child window, and in response to determining that the child window is in an unresponsive state, set the parent window attribute of the proxy window to no parent window; and remove the child window from a current display interface by removing the proxy window, wherein the proxy window and the child window are in different processes, and wherein the instructions are further executable by at least one of said at least one processor to cause at least one of said at least one processor to:

determine, by using the thread to which the proxy window belongs, that the child window is in the unresponsive state when a first message sent from the child window is not received within a first predetermined duration; and in response to determining that the child window is in the unresponsive state:
  move the child window by a distance so as to be outside of a display screen;
  create a ghost window at a position of the child window and display an image of the child window being in the unresponsive state in the ghost window;
  determine whether the child window restores a normal state by determining whether a second message sent from the child window is received within a second predetermined duration;
  in response to determining that no message has been received within the second predetermined duration, delete a first process to which the child window belongs; and
  in response to determine that the second message has been received within the second predetermined duration, removing the ghost window and restoring the child window.

* * * * *